United States Patent
Geiger (10) Patent No.: US 6,971,237 B2
(45) Date of Patent: Dec. 6, 2005

(54) SERVOACTUATOR HAVING MOTOR-DRIVEN ACTUATOR WITH HYDRAULIC FORCE AMPLIFICATION

(75) Inventor: David Geiger, Orchard Park, NY (US)

(73) Assignee: Moog Inc., East Auror, NY (US)

( * ) Notice: Subject to any disclaimer, the term of this patent is extended or adjusted under 35 U.S.C. 154(b) by 0 days.

(21) Appl. No.: 10/815,055

(22) Filed: Mar. 31, 2004

(65) Prior Publication Data

US 2004/0177612 A1 Sep. 16, 2004

Related U.S. Application Data

(63) Continuation-in-part of application No. 10/318,368, filed on Dec. 12, 2002, now Pat. No. 6,851,261, which is a continuation-in-part of application No. 09/884,626, filed on Jun. 19, 2001, now abandoned, which is a continuation of application No. 09/708,904, filed on Nov. 8, 2000, now abandoned.

(51) Int. Cl.[7] .............................................. F15B 7/00
(52) U.S. Cl. ............................ 60/545; 60/571; 60/593
(58) Field of Search .......................... 60/545, 571, 593, 60/533, 591, 565; 91/435, 436, 437, 438

(56) References Cited

U.S. PATENT DOCUMENTS

| | | | | |
|---|---|---|---|---|
| 4,968,239 A | * | 11/1990 | Inaba et al. ................. | 425/150 |
| 5,345,766 A | * | 9/1994 | Leonhartsberger et al. ... | 60/545 |
| 6,439,875 B1 | * | 8/2002 | Morita et al. ............... | 425/556 |
| 6,851,261 B2 | * | 2/2005 | Geiger ........................ | 60/545 |

* cited by examiner

*Primary Examiner*—Edward K. Look
*Assistant Examiner*—Michael Leslie
(74) *Attorney, Agent, or Firm*—Phillips Lytle LLP (57) ABSTRACT

A servoactuator (20) is operatively arranged to control the movement of an output member (21) in either of two directions in response to a command signal. The servoactuator includes an electric motor (25); a first transmission mechanism (34); a hydrostatic second transmission mechanism (35); a transfer mechanism (36) operatively arranged to selectively couple the motor output shaft to the output member either through the first transmission mechanism to impart a high-speed low-force drive to the output member, or through the second transmission mechanism to impart a low-speed high-force drive to the output member; at least one feedback transducer (29, 32); and a servo control loop (30, 33) closed about the motor, controller, transmission mechanisms, transfer mechanism, feedback transducer and output member for selectively controlling at least one of the position, velocity or force of the output member as a function of the command signal.

22 Claims, 4 Drawing Sheets

SERVOACTUATOR HAVING MOTOR-DRIVEN ACTUATOR WITH HYDRAULIC FORCE AMPLIFICATION

CROSS-REFERENCE TO RELATED APPLICATIONS

This application is a continuation-in-part of U.S. patent application Ser. No. 10/318,368, filed Dec. 12, 2002, U.S. Pat. No. 6,851, 261, which was a continuation-in-part of prior pending U.S. patent application Ser. No. 09/884,626, filed Jun. 19, 2001(now abandoned), which was a continuation of prior pending U.S. patent application Ser. No. 09/708,904, filed Nov. 8, 2000 (now abandoned).

TECHNICAL FIELD

The present invention relates generally to the field of actuators for moving a load, and, more particularly, to an improved two-stage mechanism with a motor-driven first-stage and with a hydraulic second-stage, and which is particularly adapted for use in selectively opening and closing a mold used in a plastic molding machine.

BACKGROUND ART

A plastic molding machine typically has two mold halves that must be selectively opened and closed during an operational cycle. After a preceding article has been formed and removed, one mold half must be moved rapidly toward its cooperative mate at relatively low force to initially close the mold. Thereafter, high force is required through a short stroke to clamp the mold in a closed position before plastic material is injected therein.

To meet these requirements with purely electric motor drives requires either an excessively large motor to provide the high force needed to close the mold, or a non-linear toggle mechanism to approximately match the performance of a smaller motor to the load requirements.

A recent improvement avoids these alternatives by effectively introducing a type of selectable "gear shift" in the mold-closing drive. This "gear shift" operates uni-directionally (i.e., only as the mold is being closed and clamped, but not as the mold is being unclamped an opened) through use of a direct-acting motor-driven ball-screw to rapidly advance one mold half toward the other, followed by a hydrostatic force amplifier or intensifier in which the motor-driven screw moves a small piston that hydraulically communicates with a large piston (which was been bypassed during the rapid mold movement) to develop the high force necessary to clamp the mold.

U.S. Pat. No. 4,968,239 (facially assigned to Fanuc Ltd.) discloses an electric motor drive for a plastic molding machine. This drive provides a type of "manual transmission" by providing different-ratio gear trains that can be alternately selected by means of electromagnetic clutches. However, this reference does not appear to teach the use of a hydrostatic transmission to selectively couple the large-stroke low-force gear train to the short-stroke high-force gear train.

U.S. Pat. No. 5,345,766 (facially assigned to Engel Maschinenbau GmbH) discloses a motor/ball-screw drive for a plastic molding machine in which the motor drives through a single-sided piston which is spring loaded to a fixed position on the machine platen. When the driving force requirements exceed the spring loading, the piston is moved relative to the platen to displace fluid into a parallel single-sided larger-area piston-and-cylinder arrangement to produce a hydrostatically-amplified clamping force. Alternative valving means are described to allow the filling of the large cylinder as the platen is advanced. However, this reference does not appear to teach or suggest that the operation may be reversed when it is desired to open the mold.

U.S. Pat. No. 6,439,875 (facially assigned to Kabushiki Kaisya Meiki Seisakusyo) also discloses a motor-driven ball-screw arrangement in which the motor drives through a single-sided piston which is spring loaded to a fixed position. When the driving force requirements exceed the spring loading, the piston is moved relative to the platen to displace fluid into a parallel single-sided larger-area piston-and-cylinder arrangement to produce a hydrostatically-amplified clamping force. However, the small intensifier piston may be blocked by a solenoid valve, and the fluid supplied to the clamping piston is also controlled by a solenoid valve. Additionally, the large clamping piston has a short stroke that may be selectively coupled to the moving member at any position. Here again, this reference does not appear to teach or suggest that the operation may be reversed when it its desired to open the mold.

Recent improvements in injection molding processes include the technique of bringing the mold halves to an almost-closed position, injecting molten plastic, and then driving the mold closed to compress the plastic. This process requires that the mold actuator be moved precisely to a predetermined position and held there as plastic is injected, followed by advancement to the fully-closed position against the high compression load. The actuator must, therefore, be capable of closed-loop servo position control in both the low- and high-force modes. Closed-loop control, in turn, necessitates that the actuator be controllable in both directions.

Additionally, after an article has been molded by this method, the breakaway mold opening force that is needed to initially crack the mold may be substantially greater than the force for which the direct motor/screw drive would preferably be designed for normal rapid motion of the mold platen, thus requiring intensified force in the reverse direction to break open the mold. This is followed by a long-stroke low-force movement of one mold half relative to the other to fully open the mold.

Accordingly, it would be generally desirable to provide improved apparatus for moving one mold half relative to another, which apparatus affords the capability of a high-speed low-force approach as one mold half initially moves toward the other, holding the one mold half at a predetermined position relative to the other under closed-loop servo control, clamping the mold halves together by low-speed high-force relative movement therebetween, unclamping the mold halves by low-speed high-force relative movement therebetween in the opposite direction, followed by a high-speed low-force movement of one mold half away from the other.

DISCLOSURE OF THE INVENTION

Figure 1:
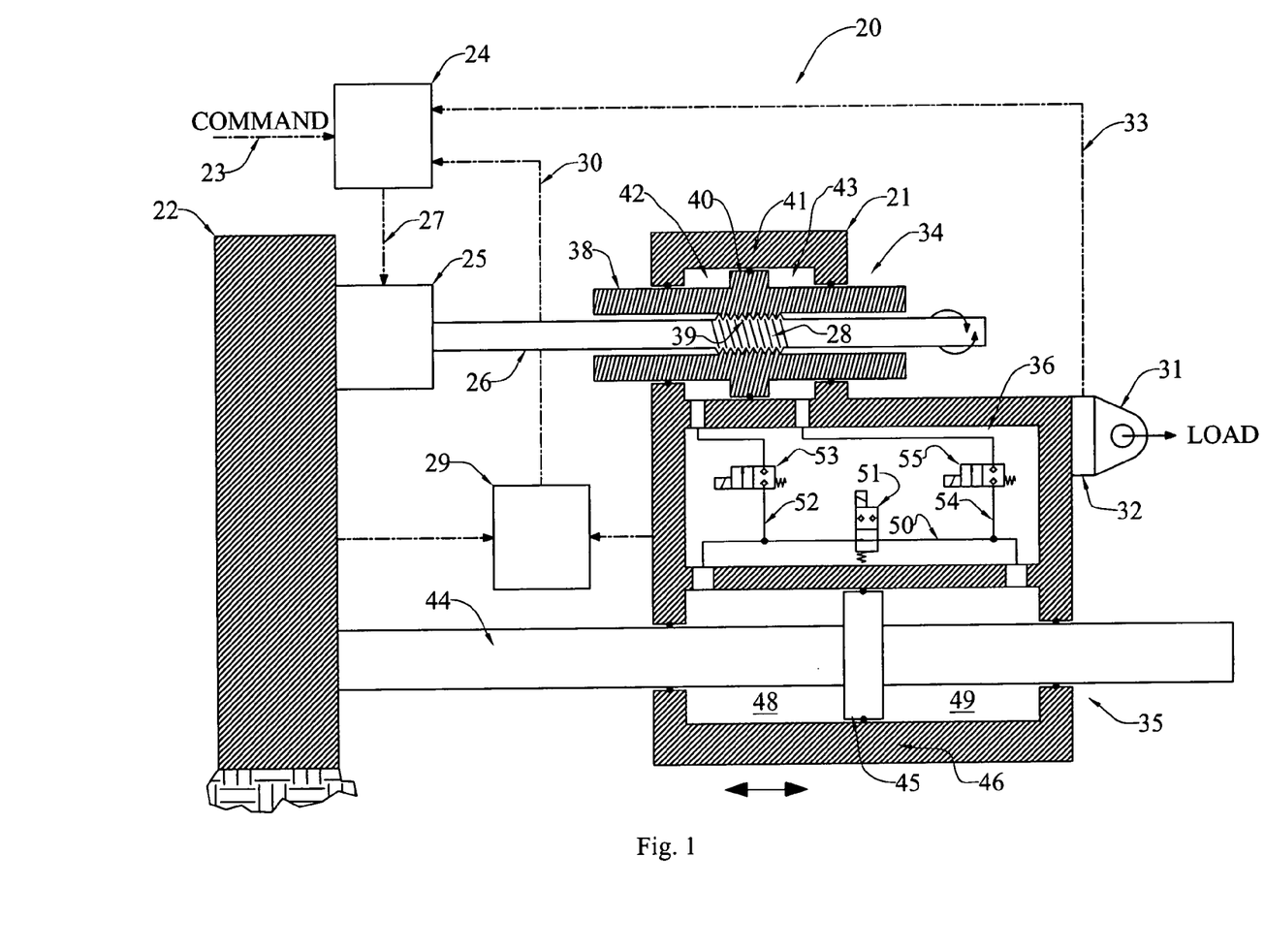
FIG. 1 is a schematic view of a first form of the improved mechanism, this view showing the output member as being movable relative to a stationary or fixed member, showing the motor-driven first transmission mechanism and the hydrostatic second transmission mechanism selectively coupled by means of a transfer mechanism including three discrete solenoid valves, and also showing the inclusion of feedback force and displacement/velocity transducers.

With parenthetical reference to the corresponding parts, portions or surfaces of the embodiment shown in FIG. 1, merely for purposes of illustration and not by way of limitation, the present invention broadly provides an improved mechanism for selectively controlling the movement of an output member in either of two opposite directions in response to a command signal.

In one aspect, the mechanism (20) is arranged to selectively control the movement of a linearly-displaceable member (21) relative to a frame (22). The improved mechanism comprises: a motor (25) mounted on one of the member and frame, and having a rotatable output shaft (26); a first mechanical transmission (34) having a screw (28) with an axial force reaction bearing mounted on one of the member and frame, and having a nut (39) mounted on the other of the member and frame, the nut being in mating engagement with the screw; the motor shaft being arranged to rotate one of the screw and nut with respect to the other of the screw and nut so as to displace the member with respect to the frame; a hydrostatic second transmission (35) having first and second pistons (40, 45), the first piston being arranged in series between the axial force reaction bearing and the screw, the first piston (40) being operatively arranged to generate pressure as a function of the axial force reacted through the first mechanical transmission, the second piston (45) being arranged to produce a pressure-induced force between the frame and member; a transfer mechanism (36) operatively arranged to either (a) lock the first piston relative to one of the frame and member and to allow free motion of the second piston relative to the other of the frame and member, or (b) transfer fluid from the first piston to the second piston; whereby the motor output shaft may be selectively coupled to the member either through the first transmission to impart a high-speed low-force drive to the member, or through the second transmission to impart a low-speed high-force drive to the member.

The first piston maybe mounted for sealed sliding movement within a first cylinder, and may be mounted for axial and rotative movement relative to the first cylinder. The first piston and the first cylinder may act as the axial force reaction bearing. The second piston may be mounted for sealed sliding movement within a second cylinder. The mechanism may further include an engaging device for selectively coupling the second transmission mechanism to the output member at any position of the output member.

In an other aspect, the invention provides an improved mechanism (20) for selectively controlling the movement of a linearly-displaceable member (21) in two directions relative to a frame, comprising: a motor (25) mounted on one of the member and frame, and having a rotatable output shaft (26); a first mechanical transmission (34) having a screw (28) with an axial force reaction bearing mounted on one of the member and frame, and having a nut (39) mounted on the other of the member and frame, the nut being in mating engagement with the screw; the motor shaft being arranged to rotate one of the screw and nut with respect to the other of the screw and nut so as to displace the member with respect to the frame; a hydrostatic second transmission (35) having first and second pistons (40, 45), the first piston (40) being operatively arranged to generate pressure as a function of the axial force reacted through the first mechanical transmission, the second piston (45) being arranged to produce a pressure-induced force between the frame and member; a transfer mechanism (36) operatively arranged to either (a) lock the first piston relative to one of the frame and member and to allow free motion of the second piston relative to the other of the frame and member, or (b) transfer fluid from the first piston to the second piston; whereby the motor output shaft may be selectively coupled to the member either through the first transmission to impart a high-speed low-force drive to the member, or through the second transmission to impart a low-speed high-force drive to the member.

The first piston may be mounted for sealed sliding movement within a first cylinder, and may be mounted for axial and rotative movement relative to the first cylinder. The first piston and the first cylinder may act as the axial force reaction bearing. The second piston may be mounted for sealed sliding movement within a second cylinder. The mechanism may further include an engaging device for selectively coupling the second transmission mechanism to the output member at any position of the output member.

In another aspect, the invention provides an improved mechanism (20) for selectively controlling the movement of an output member (21) in two directions in response to a command signal, comprising: (25) an electric motor having an output shaft (26); a motor controller (24) arranged to provide a drive current to the motor for controllably moving the output shaft; a first transmission mechanism (34) operatively arranged to displace the output member in either direction at a nominal first ratio with respect to the motor output shaft; a hydrostatic second transmission mechanism (35) operatively arranged to displace the output member in either direction at a nominal second ratio with respect to the motor output shaft; a transfer mechanism (36) operatively arranged to selectively couple the motor output shaft to the output member either through the first transmission mechanism to impart a high-speed low-force drive to the output member, or through the second transmission mechanism to impart a low-speed high-force drive to the output member; at least one feedback transducer (29, 31) capable of measuring one of the force, displacement or velocity of the output member; and a servo control loop closed about the motor, controller, transmission mechanisms, transfer mechanism, feed-back transducer and output member for selectively controlling at least one of the position, velocity or force of the output member as a function of the command signal.

The mechanism may further include an engaging device (e.g., 61 in FIG. 2) for selectively coupling the second transmission mechanism to the output member at any position of the output member.

The first transmission mechanism may be hydrostatic, and may include a pump driven by the motor and a first piston coupled to the output member. It may also further include a second piston coupled to the output member, and a plurality of valve components operatively arranged to selectively couple the flow output of the pump to the second piston. The first transmission mechanism may include a screw thread and nut. The transfer mechanism may include a plurality of valves operatively arranged to selectively either (a) lock the nut to the output member and allow the second transmission mechanism to be decoupled from the output member, or (b) couple motion of the nut relative to the output member through the second transmission mechanism to the output member.

Accordingly, the general object of the invention is to provide an improved mechanism for selectively controlling the movement of an output member (e.g., a movable mold half) in either of two directions as a function of a supplied command signal.

Another object is to provide an improved mechanism for use in plastic molding machinery, which allows one mold half to initially advance toward another by means of a high-speed low-force drive, and thereafter allows the two mold halves to be clamped together by means of a low-speed high-force drive.

Still another object is to provide an improved mechanism for use in plastic molding machinery that allows two mold halves to be separated by means of a low-speed high-force drive to initially unclamp the mold halves, followed by a high-speed low-force drive to quickly move the separated mold halves away from one another.

These and other objects and advantages will become apparent from the foregoing and ongoing written specification, the drawings, and the appended claims.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

As used herein, the term "servoactuator" is a mechanism that has a closed-loop servo control, typically of force, position or velocity, of one member relative to another. The term "mechanism" does not necessarily imply such closed-loop servo control. Thus, a "servoactuator" is a species of a "mechanism".

First Embodiment (FIG. 1)

Referring now to the drawings, and, more particularly, to FIG. 1 thereof, a first form of the improved servoactuator is generally indicated at 20.

This servoactuator is operatively arranged to selectively control the movement of an output member, generally indicated at 21, in either horizontal direction (i.e., leftwardly or rightwardly) relative to a stationary or fixed support 22 in response to a command signal supplied on line 23 to a motor controller, indicated by box 24. Controller 24 is operatively arranged to provide appropriate drive current(s) via line 27 to an electric motor, indicated in box 25, having a rotatable output shaft 26. Shaft 26 is shown as having an externally-threaded portion 28.

A feedback transducer 29 is operatively arranged to sense either the position or velocity, as appropriate, of the output member 21 relative to stationary member 22, and to provide such information as a feedback signal via line 30 to controller 24.

Output member 21 is also shown as having a clevis member 31 connected to an opposing (i.e., resistive) load, such as a mold half (not shown) of a plastic molding machine (not shown). A force transducer 32 is operatively interposed between the output member 21 and clevis member 31, and is operatively arranged to supply a force feedback signal via line 33 to motor controller 24.

The servoactuator is shown as having a first transmission mechanism, generally indicated at 34, operatively arranged to displace the output member in either horizontal direction at a nominal first ratio with respect to the rotation of the motor output shaft. The servoactuator is also shown as having a hydrostatic second transmission mechanism, generally indicated at 35, that is operatively arranged to displace the output member in either horizontal direction at a nominal second ratio with respect to the rotation of the motor output shaft. The output member is further shown as having a transfer mechanism, collectively indicated at 36, that is operatively arranged between the first and second transmission mechanisms for selectively coupling the motor output shaft to the output member either: (a) through the first transmission mechanism to impart a high-speed low-force drive to the output member, or (b) through the second transmission mechanism to impart a low-speed high-force drive to the output member.

More particularly, the first transmission mechanism is shown as having a horizontally-elongated specially-configured tubular member 38. A portion of member 38 is internally threaded, as indicated at 39, to form a nut-like member, and these threads are in mating engagement with the external threads 28 on output shaft 26. An annular flange extends radially outwardly from an intermediate portion of member 38 to form a piston 40 which is mounted for sealed sliding movement within a cylinder 41 provided in the output member. Piston 40 thus sealingly subdivides cylinder 41 into a left chamber 42 and a right chamber 43. Piston 40 has equal annular areas facing into chambers 42 and 43.

The second transmission mechanism 35 is more fully shown as including a horizontally-elongated rod 44 having its left end mounted on stationary portion 22 and as extending rightwardly therefrom. A piston 45 is fixed to rod 44, and is mounted for sealed sliding movement within a cylinder 46 provided in the output member. Piston 45 has equal-area annular surfaces facing into left and right chambers 48, 49, respectively.

Chambers 48 and 49 communicate with one another via a line 50 which contains a two-position normally-open solenoid valve 51. First transmission mechanism left chamber 42 communicates with line 50 via line 52, which contains a two-position solenoid valve 53. First transmission mechanism right chamber 43 communicates with line 50 via line 54, which contains two-position solenoid valve 55. Solenoid valves 51, 53, 55 are controlled by suitable means that are well known to persons skilled in this art, but have been deliberately omitted from FIG. 1 to avoid obfuscating the invention.

In operation, clevis member 31 is connected to an opposing load (e.g., a movable mold half). A command signal is provided via line 23 to motor controller 24. This causes the controller to send appropriate drive current(s) via line 27 to electric motor 25, which selectively rotates output shaft 26 in the appropriate angular direction. The first transmission mechanism might be modified to use a linear motor, as desired.

Solenoid valves 53 and 55 are normally closed to trap hydraulic fluid in chambers 42, 43, but solenoid valve 51 is normally open to allow fluid to flow between chambers 48, 49. Since liquid is relatively incompressible, rotation of shaft 26 causes a corresponding horizontal movement, either leftwardly or rightwardly depending upon the direction of rotation of shaft 26, of the output member 21 by virtue of the screw thread connection between shaft 26 and threaded portion 39. This then causes horizontal movement of the output member in either direction at a nominal first ratio with respect to the rotation of the motor output shaft. At the same time, solenoid 51 is open so as to allow fluid to flow freely between second transmission mechanism chambers 48 and 49. Thus, the first transmission mechanism may be used to quickly move the output member relative to the stationary portion at relatively low force.

The force exerted by the load on the output member is sensed by force sensor 32, which provides a feedback signal via line 33 to controller 24. Similarly, the position (i.e., displacement or velocity, as appropriate) of the movable member 21 relative to the stationary member 22 is continuously monitored by means of transducer 29, which, in turn, provides a feedback signal via line 30 to controller 24.

When the controller (or some other controlling device) senses that the load has increased beyond a predetermined value, as during mold closing, appropriate signals are sent to the three solenoid valves to close solenoid valve 51 and to open solenoid valves 53 and 55. Thereafter, continued rotation of the motor output shaft will cause movement of first transmission mechanism piston 40 within cylinder 41. Since chamber 42 communicates with chamber 48 via now-opened solenoid valve 53, and since chamber 43 communicates with chamber 49 via now-opened solenoid valve 55, continued rotation of the motor output shaft will cause some relative movement between piston 40 and cylinder 41, creating communicating flows with respect to these chambers. This then creates a force amplification, which is a function of the ratio of the areas of the annular faces of pistons 45 and 41, to continue movement of the output member in the indicated direction at a lower speed, but at a substantially increased force.

Thus, if the load is a mold half, the first transmission mechanism may be used to provide a high-speed low-force drive to the output member as the mold halves are moved toward one another, and the second transmission mechanism may be thereafter used to create a low-speed high-force drive, as when the two mold halves are being clamped together. When it is desired to open the mold halves, the operation is reversed, with the second transmission mechanism creating a low-speed high-force drive to the output member to initially break the two mold halves apart, followed by use of the first transmission mechanism to quickly move the now-unclamped mold halves rapidly away from one another.

Figure 2:
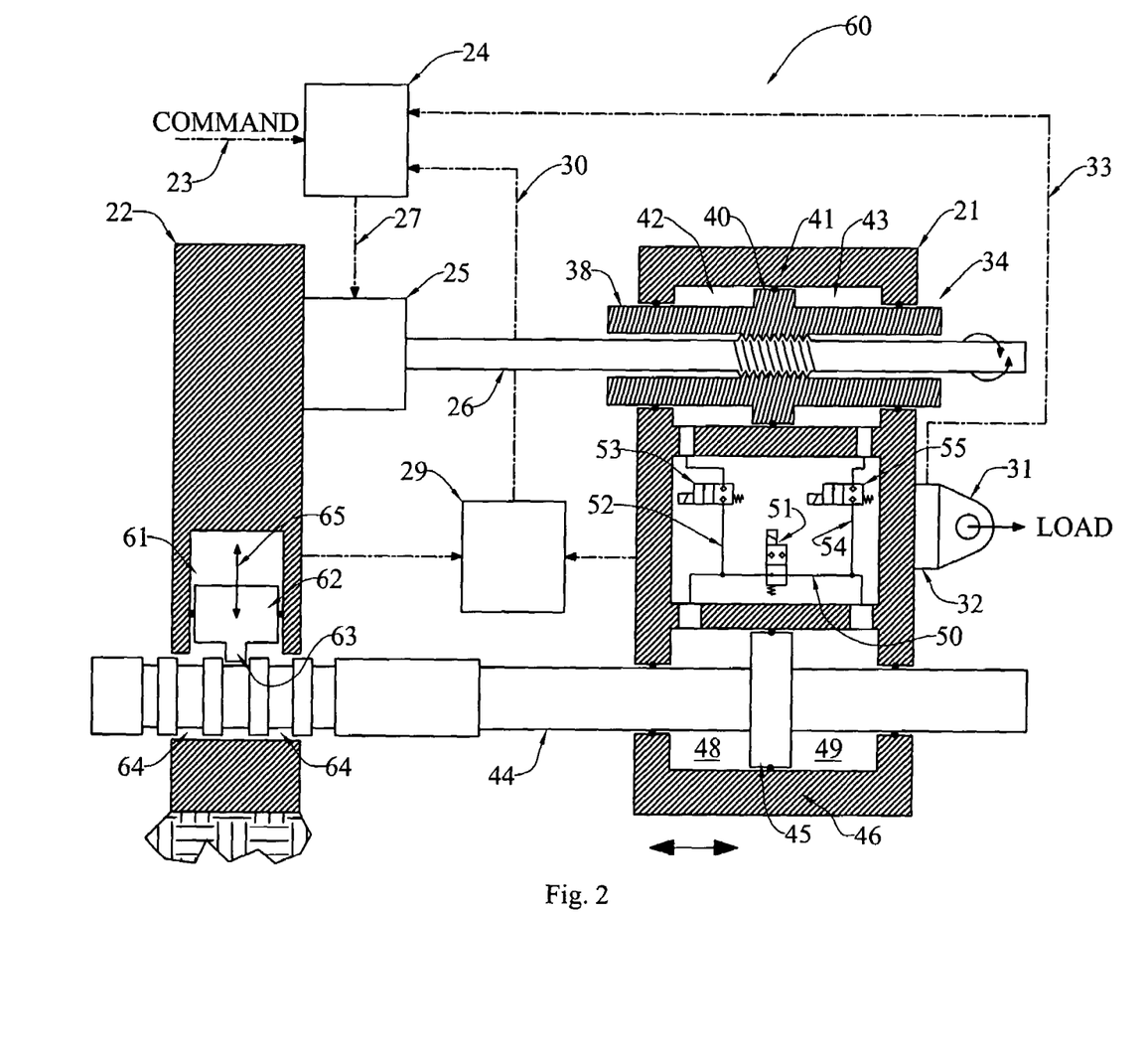
FIG. 2 is a schematic view of the second form of the improved mechanism, generally similar to FIG. 1, but showing the inclusion of an engaging device for selectively coupling the second transmission mechanism to the stationary member at various positions of the output member.

Second Embodiment (FIG. 2)

A second form of the improved servoactuator is generally indicated at 60 in FIG. 2. This second form contains many of the parts and components that were contained in the first embodiment. Hence, wherever possible, the same reference numeral has been used in FIG. 2 to indicate like parts and components previously-described. Because of this, a detailed description of these previously-described parts will be omitted, with the following description focusing not on the similarities, but the differences between the second embodiment shown in FIG. 2 with respect to the first embodiment shown in FIG. 1.

While output member 21 is depicted as being physically somewhat different, it will be noted that it has, in substance, the same functional elements previously described.

The salient difference between FIGS. 1 and 2 is that the second embodiment shown in FIG. 2 contains an engaging device, generally indicated at 61, that is operatively arranged within stationary member 22. This engaging device has a piston-like member 62 that contains a downwardly-extending lug or boss 63. Rod 44, rather than being fixed to stationary support 22, is now mounted for selective movement through a hole provided in the stationary member. The left marginal end portion of rod 44 is of slightly-enlarged radius, and has a plurality of axially-spaced annular grooves or recesses, severally indicated at 64, that are configured and arranged to accommodate insertion of boss or lug 63. As indicated by the arrows 65, member 62 is adapted to be selectively moved toward and away from rod 44 to lock lug 63 into an aligned one of recesses 64, and away from rod 44 to release this connection. The means or mechanism for moving member 62 are not specifically shown. It might, for example, be a hydraulic arrangement, or the like. The specific implementation is considered to be well within the ability of a person skilled in this art, but has been omitted in the interest of clarity. The command for such movement is supplied from controller 24 or some other controller.

The second embodiment operates substantially as the first embodiment, except as indicated below. When the first transmission mechanism is used to quickly move the output member and load, controller 24 causes member 62 to move upwardly within the recess provided in stationary part 22 to allow free horizontal sliding movement of rod 44 within the opening provided through stationary member 22. During this mode, solenoid valves 53, 55 are closed so that piston 40 is hydraulically locked within its cylinder, but solenoid valve 51 is open to allow fluid to flow between chambers 48, 49. However, when the controller senses that the load is increasing, as when the mold is beginning to clamp, the controller sends an appropriate signal to move member 62 downwardly so that lug 63 snaps into one of recesses 64. At the same time, the controller supplies appropriate signals to open solenoid valves 53 and 55, and to close solenoid valve 51, as previously described. Thereafter, continued operation of the motor will cause fluid flow from the first transmission mechanism to the second transmission mechanism to provide a low-speed high-force drive to the output member, as when the mold halves are being clamped or unclamped.

Operation in the opposite direction is the reverse of that previously-described, with the rapid movement of the output member being controlled by the first transmission mechanism.

Figure 3:
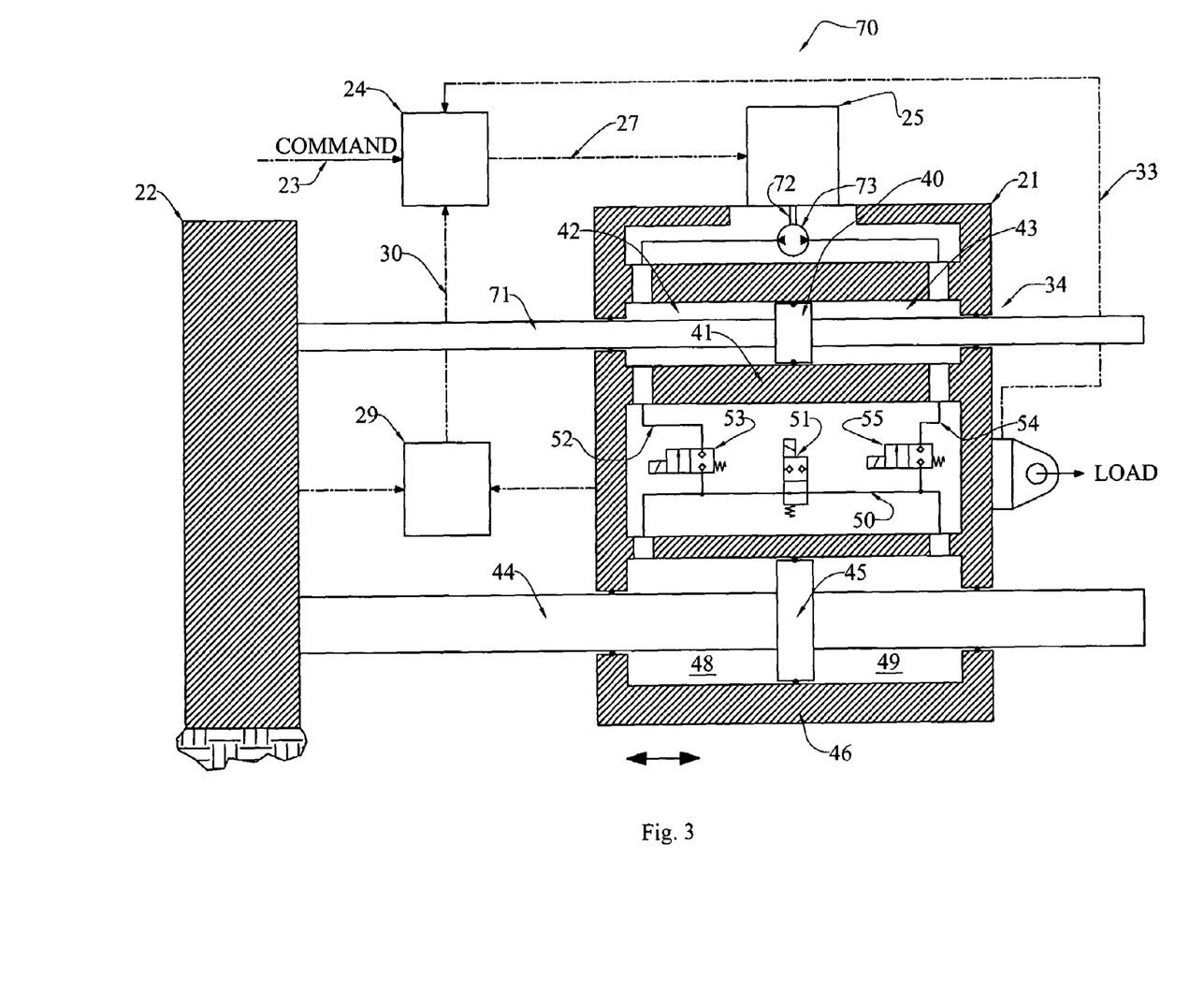
FIG. 3 is a schematic view of a third form of the improved mechanism, this view showing hydrostatic first and second transmission mechanisms, the inclusion of a motor-driven pump, and two feedback transducers supplying their respective signals to the motor controller.

Third Embodiment (FIG. 3)

A third form of the improved servoactuator is generally indicated at 70 in FIG. 3. Here again, this third form contains many of the portions or elements previously described. Hence, the same reference numeral will be used to describe the same structure, except where indicated. This third form has an output member 21 that is mounted for horizontal movement, either leftwardly or rightwardly, relative to stationary member 22.

However, piston 40 is mounted on a rod 71 having its left end fixed to stationary member 22 and extending rightwardly therefrom. Similarly, the second transmission mechanism includes rod 44 having its left end fixed to stationary member 22. In this form, the motor 25 has an output shaft 72 that is arranged to rotate the impeller of a pump 73 to displace fluid between first transmission mechanism chambers 42 and 43, respectively. In other words, the output shaft 26 having the screw thread 28 in FIG. 1 has been replaced by an output shaft 72 and pump 73. Thus, when the load is less than the predetermined minimum load, controller 24 will transmit appropriate drive current(s) to motor 25 to cause rotation of output shaft 72 and operation of pump 73. This will pump fluid between first transmission mechanism chambers 42 and 43 to move the output member, either leftwardly or rightwardly (as appropriate), relative to rod 71 and stationary member 22. As with the first embodiment, when this occurs, the solenoid valves 53 and 55 are closed, while solenoid valve 51 is opened to allow fluid communication between second transmission mechanism chambers 48 and 49.

When it is desired to exert a greater force, as when the mold halves are beginning to clamp, solenoids 53 and 55 are opened, and solenoid 51 is closed. This then communicates chambers 42 with 48, and 43 with 49. Thereafter, continued operation of motor 25 will pump fluid between chambers 43, 49 and chambers 42, 48, respectively. The hydraulic connection of the corresponding actuator chambers of the first and second transmission mechanisms has the effect of increasing the area against which the pump pressure differential acts, to increase the closing force imparted to the mold halves.

To unclamp the mold halves, the operation is reversed. Initially, solenoid valve 51 is closed and solenoid valves 53 and 55 are opened to allow a low-speed high-force breakaway of the mold halves. Thereafter, solenoid valve 51 may be opened, and solenoid valves 53 and 55 may be closed, to permit a high-speed retracting movement of the output member, with the second transmission mechanism chambers 48 and 49 being in communication with one another through conduit 50 and now-opened solenoid valve 51.

Figure 4:
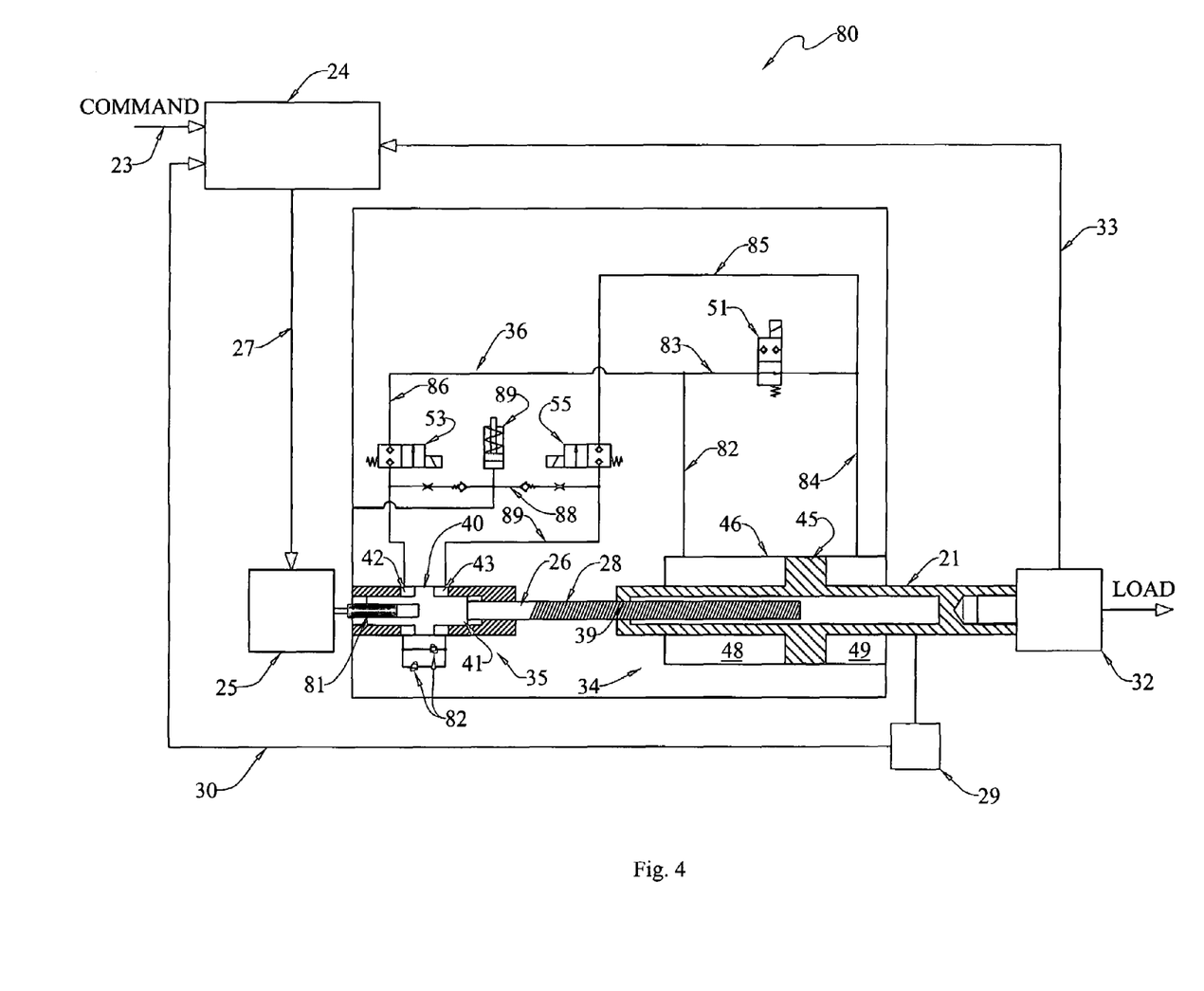
FIG. 4 is a schematic view of a fourth form of the improved mechanism, showing variant forms of the first and second transfer mechanisms.

Fourth Embodiment (FIG. 4)

A fourth form of the improved servoactuator is generally indicated at 80 in FIG. 4. As with the earlier embodiments, this fourth form contains many of the portions or elements previously described. Hence, the same reference numeral will again be used to describe the same structure, except where indicated.

A command signal is supplied on line 23 to a controller, indicated by box 24. Force sensor 32, such as a load cell, supplies a force feedback signal to the controller via line 33. The position of the output member 21 is determined by position sensor 29, which also provides a position feedback signal via line 30 to controller 24. Controller 24 provides drive signal(s) via line 27 to a motor 25.

In this form, the first mechanical transmission 34 is shown as including a motor-driven screw thread 28, which is engaged by a nut 39 provided on output member 21. Thus, rotation of shaft 26 will cause the output member to be displaced, either leftwardly or rightwardly depending on the direction of motor rotation, at a first ratio.

In this form, the second transmission mechanism 36 is shown as including a specially-configured piston 40 operatively arranged in a cylinder 41, and sealingly separating opposed chambers 42, 43. Axial motion of the piston within the cylinder is accommodated by splined connection 81 between the motor output shaft and the piston. Piston 40 is also connected to shaft 26. The opposing chambers of the first piston communicate via pressure relief valves, severally indicated at 82.

A second piston 45 is operatively connected to output member 21, and is arranged for sealed sliding motion within a cylinder 46. The opposed chambers 48, 49 communicate with one another via conduits 82, 83 and 84. Conduit 83 includes a solenoid-operated two-position valve 51. Conduit 84 communicates via conduit 85 and another solenoid-operated two-position valve 55 with the right chamber 43 of the second transmission mechanism. The left chamber 42 of this second transmission mechanism communicates with conduit 83 via conduit 86, which contains another solenoid-operated valve 53. Opposed check valves are arranged in another conduit 88, which communicates conduits 86 and 85. A pressure relief valve 89 communicates with conduit 88 via conduit 89.

As in the other embodiments, when it is desired to quickly move the two mold halves toward one another at relatively low force, valves 53, 55 are maintained in the closed position (as shown) to prevent fluid from flowing between chambers 42 and 43. Thus, rotation of the motor output shaft causes a corresponding rotation of piston 40 within cylinder 41, and a like rotation of shaft 26. This causes the output member 21 to move in the appropriate direction at the nominal first ratio.

When it is desired to clamp the molds at high force, solenoids 51, 53 and 55 are each moved to their alternative positions. Thus, communication between actuator chambers 48, 49 is blocked by now-closed solenoid valve 51. At the same time, continued rotation of the motor will create a high pressure in chamber 42, which may pass via now-opened solenoid 53 via conduits 86, 82 into actuator left chamber 48. Similarly, return flow from chamber 49 may flow through conduits 84, 85 and now-opened solenoid valve 55 to chamber 43.

When it is desired to unclamp the actuator, the motor is simply operated in the opposite direction with the solenoid still in the positions they were in when the mold was clamped. This allows a breakaway movement of the mold halves at high force. After such initial breakaway, the three solenoids are then de-energized to cause them to revert to the position shown, after which the mold halves may move away from one another at high speed.

Modifications

The present invention contemplates that many changes and modifications maybe made.

For example, the motor may be used to drive a threaded connection between the motor output shaft and the output member. Alternatively, the motor output may be connected to a pump to provide fluid power, rather than mechanical power between these elements. Motors having linear or rotational outputs may be used. The first transmission mechanism may include a piston of one area operatively arranged within a cylinder and used to selectively displace fluid to a second cylinder. Alternatively, the pump may selectively communicate with both piston head faces so as to increase the effective area of the pistons. While the present invention is shown as using solenoid valves as part of the transfer mechanism, other types of valving arrangements might alternatively be used. The present invention uses at least one feedback transducer that is capable of measuring force, displacement or velocity. In the form shown, transducer 32 is employed to measure the force of the load on the output member, and transducer 29 is operatively arranged to measure either the velocity or the displacement of the output member relative to the stationary member. The reader will recall that velocity is the time derivative of position (i.e., v=ds/dt). Hence, velocity and position are mathematically related to one another.

Therefore, while four presently-preferred forms of the inventive servoactuator have been shown and described, and various modifications and changes thereof discussed, persons skilled in this art will readily appreciate that various additional changes and modifications may be made without departing from the spirit of the invention, as defined and differentiated by the following claims.

What is claimed is:

1. A mechanism for selectively controlling the movement of a linearly-displaceable member relative to a frame, comprising:
    a motor mounted on one of said member and frame, and having a rotatable output shaft;
    a first mechanical transmission having a screw with an axial force reaction bearing mounted on one of said member and frame, and having a nut mounted on the other of said member and frame, said nut being in mating engagement with said screw;
    said motor shaft being arranged to rotate one of said screw and nut with respect to the other of said screw and nut so as to displace said member with respect to said frame;
    a hydrostatic second transmission having first and second pistons, said first piston being arranged in series between said axial force reaction bearing and said screw, said first piston being operatively arranged to generate pressure as a function of the axial force reacted through said first mechanical transmission, said second piston being arranged to produce a pressure-induced force between said frame and member;
    a transfer mechanism operatively arranged to either (a) lock said first piston relative to one of said frame and member and to allow free motion of said second piston relative to the other of said frame and member, or (b) transfer fluid from said first piston to said second piston;
    whereby said motor output shaft may be selectively coupled to said member either through said first transmission to impart a high-speed low-force drive to said member, or through said second transmission to impart a low-speed high-force drive to said member.

2. A mechanism as set forth in claim 1 wherein said first piston is mounted for sealed sliding movement within a first cylinder.

3. A mechanism as set forth in claim 2 wherein said first piston is mounted for axial and rotative movement relative to said first cylinder.

4. A mechanism as set forth in claim 3 wherein said first piston and said first cylinder act as said axial force reaction bearing.

5. A mechanism as set forth in claim 2 wherein said second piston is mounted for sealed sliding movement within a second cylinder.

6. A mechanism as set forth in claim 1, and further comprising:
    an engaging device for selectively coupling said second transmission mechanism to said output member at any position of said output member.

7. A mechanism for selectively controlling the movement of a linearly-displaceable member in two directions relative to a frame, comprising:
    a motor mounted on one of said member and frame, and having a rotatable output shaft;
    a first mechanical transmission having a screw with an axial force reaction bearing mounted on one of said member and frame, and having a nut mounted on the other of said member and frame, said nut being in mating engagement with said screw;
    said motor shaft being arranged to rotate one of said screw and nut with respect to the other of said screw and nut so as to displace said member with respect to said frame;
    a hydrostatic second transmission having first and second pistons, said first piston being operatively arranged to generate pressure as a function of the axial force reacted through said first mechanical transmission, said second piston being arranged to produce a pressure-induced force between said frame and member;
    a transfer mechanism operatively arranged to either (a) lock said first piston relative to one of said frame and member and to allow free motion of said second piston relative to the other of said frame and member, or (b) transfer fluid from said first piston to said second piston;
    whereby said motor output shaft maybe selectively coupled to said member either through said first transmission to impart a high-speed low-force drive to said member, or through said second transmission to impart a low-speed high-force drive to said member.

8. A mechanism as set forth in claim 7 wherein said first piston is mounted for sealed sliding movement within a first cylinder.

9. A mechanism as set forth in claim 8 wherein said first piston is mounted for axial movement relative to said first cylinder.

10. A mechanism as set forth in claim 9 wherein said first piston and said first cylinder act as said axial force reaction bearing.

11. A mechanism as set forth in claim 8 wherein said second piston is mounted for sealed sliding movement within a second cylinder.

12. A mechanism as set forth in claim 7, and further comprising:
    an engaging device for selectively coupling said second transmission mechanism to said output member at any position of said output member.

13. A servoactuator for selectively controlling the movement of an output member in two directions relative to a frame in response to a command signal, comprising:
    an electric motor having an output shaft;
    a motor controller arranged to provide a drive current to said motor for controllably moving said output shaft;
    a first transmission mechanism operatively arranged to displace said output member in either direction at a nominal first ratio with respect to said motor output shaft; and
    a hydrostatic second transmission mechanism operatively arranged to displace said output member in either direction at a nominal second ratio with respect to said motor output shaft; and
    a transfer mechanism operatively arranged to selectively couple said motor output shaft to said output member either through said first transmission mechanism to impart a high-speed low-force drive to said output member, or through said second transmission mechanism to impart a low-speed high-force drive to said output member.

14. A mechanism as set forth in claim 13, and further comprising:
- at least one feedback transducer capable of measuring one of the force, displacement or velocity of said output member; and
- a servo control loop closed about said motor, controller, transmission mechanisms, transfer mechanism, feedback transducer and output member for selectively controlling at least one of the position, velocity or force of said output member as a function of said command signal.

15. A mechanism as set forth in claim 13, and further comprising:
- an engaging device for selectively coupling said second transmission mechanism to said output member at any position of said output member.

16. A mechanism as set forth in claim 13 wherein said first transmission mechanism is hydrostatic.

17. A mechanism as set forth in claim 16 wherein said first transmission mechanism includes a pump driven by said motor and a first piston coupled to said output member.

18. A mechanism as set forth in claim 17 and further comprising a second piston coupled to said output member, and a plurality of valve components operatively arranged to selectively couple the flow output of said pump to said second piston.

19. A mechanism as set forth in claim 13 wherein said first transmission mechanism includes a screw thread and nut.

20. A mechanism as set forth in claim 19 wherein said first piston is arranged in series between said nut and one of said output member and frame.

21. A mechanism as set forth in claim 19 wherein said screw has a screw reaction bearing and wherein said first piston is arranged in series between said screw reaction bearing and one of said output member and frame.

22. A mechanism as set forth in claim 18 wherein said transfer mechanism comprises a plurality of valves operatively arranged to selectively either (a) lock said nut to said output member and allow said second transmission mechanism to be decoupled from said output member, or (b) couple motion of said nut relative to said output member through said second transmission mechanism to said output member.

* * * * *